Oct. 15, 1968     M. C. SYLWAN     3,405,458
BUILDING SETS
Filed Aug. 24, 1965     11 Sheets-Sheet 3

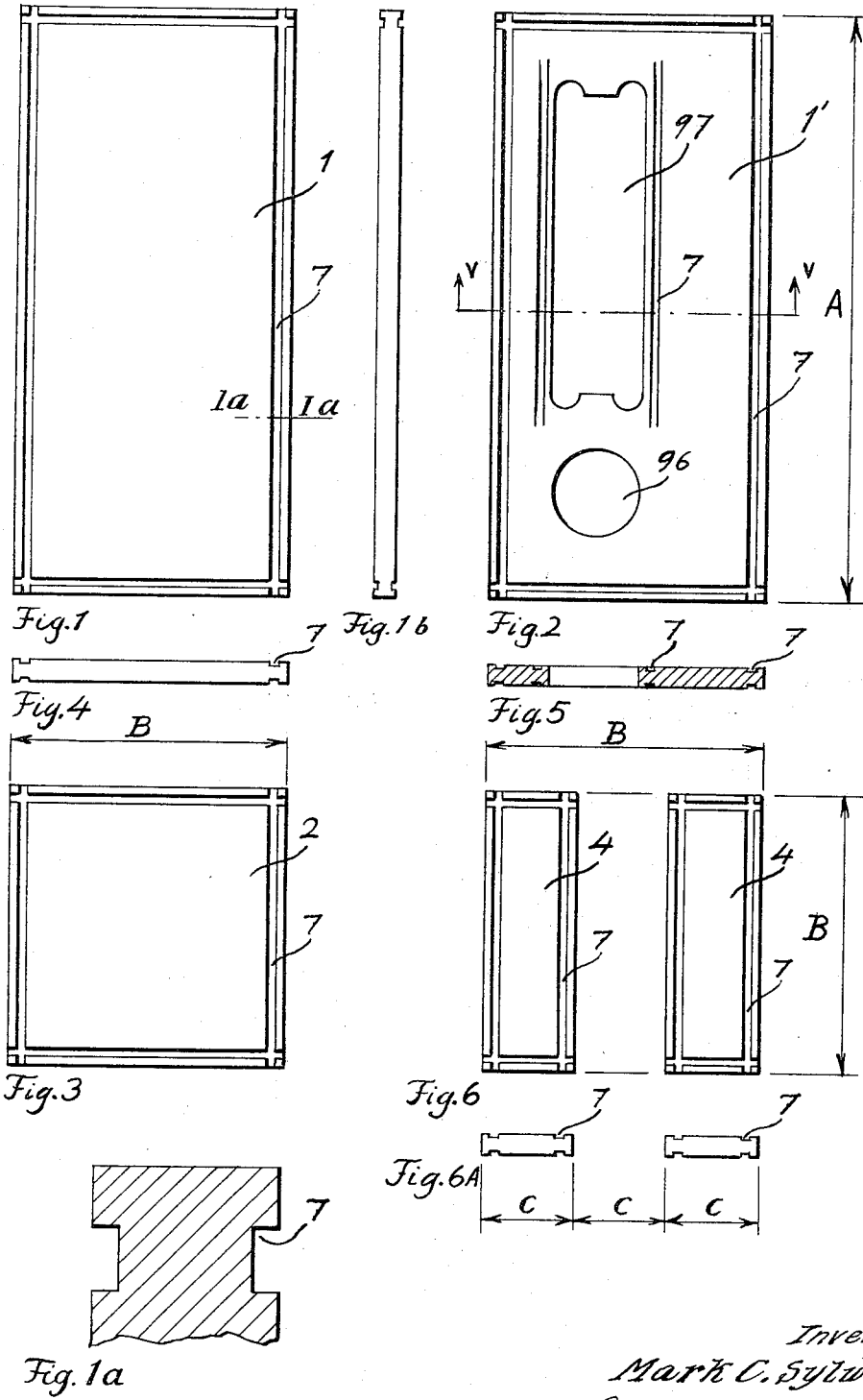

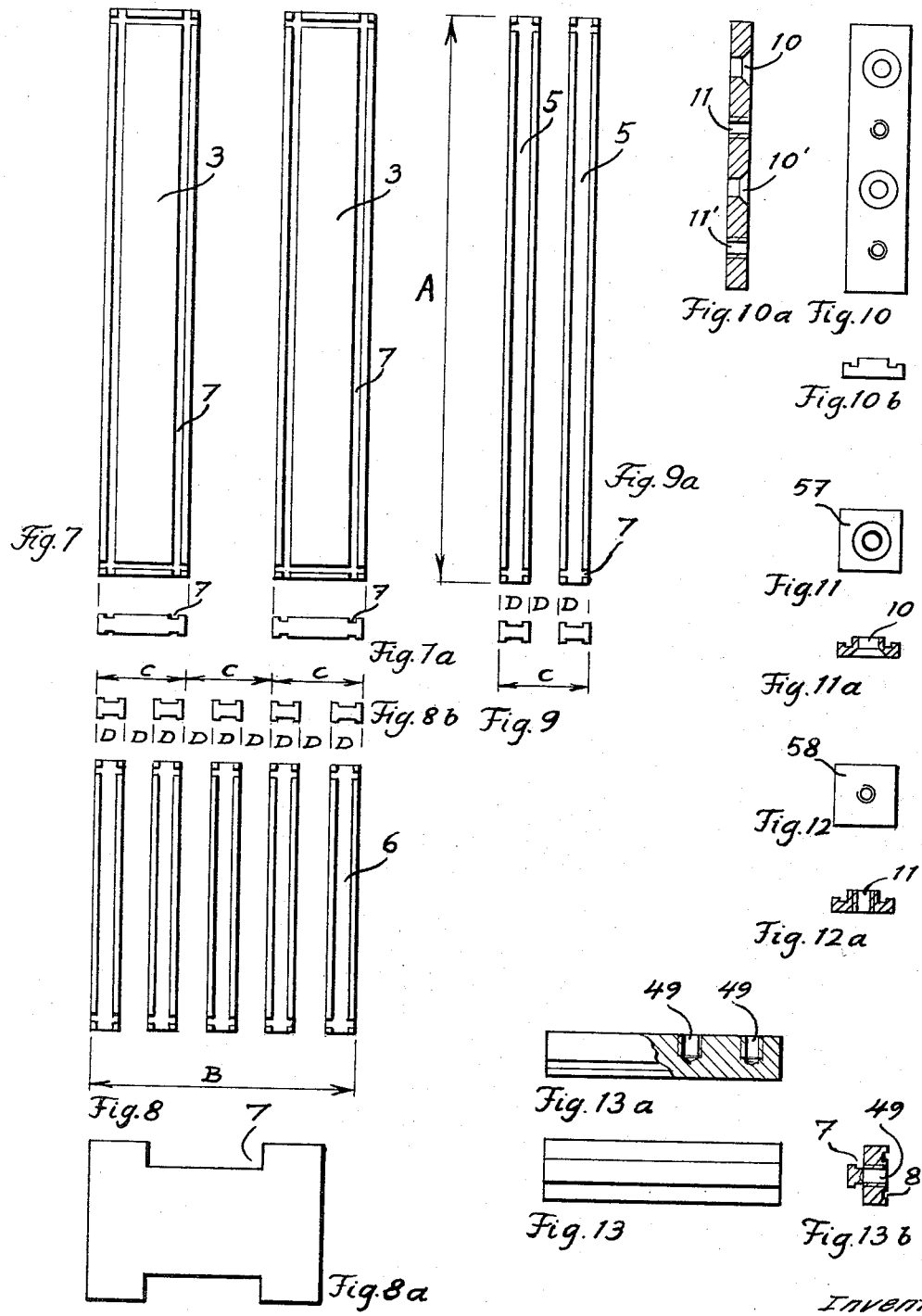

Inventor
Mark C. Sylwan,
By Sommers & Young
Attorneys

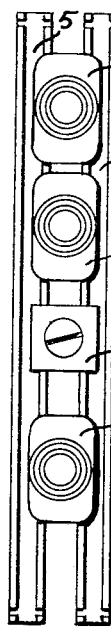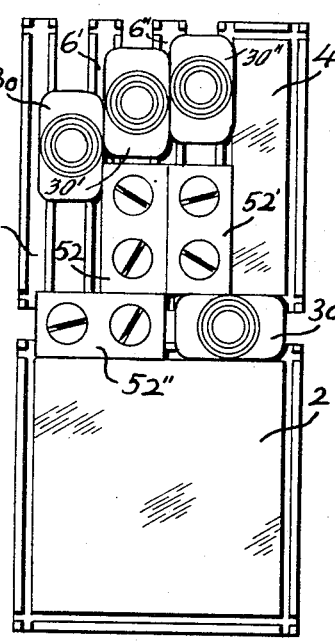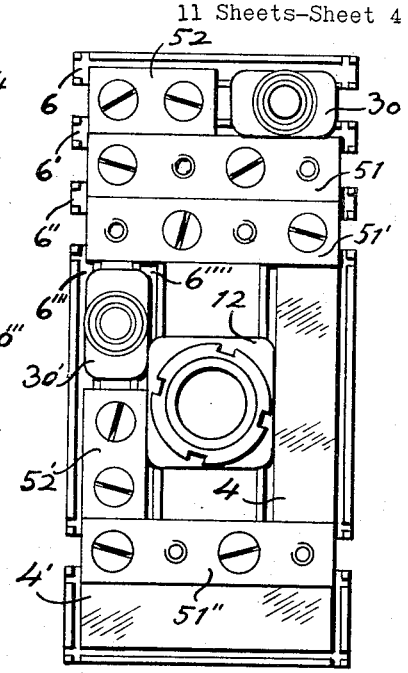
Fig. 20  Fig. 23  Fig. 26
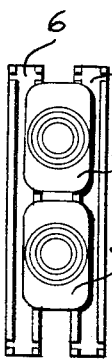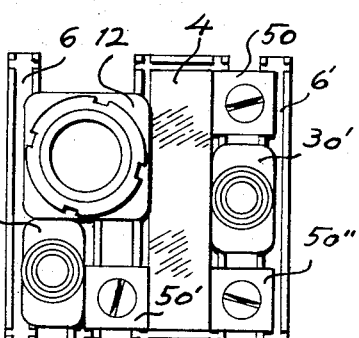
Fig. 21  Fig. 24
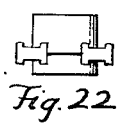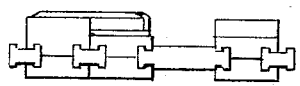
Fig. 22  Fig. 25

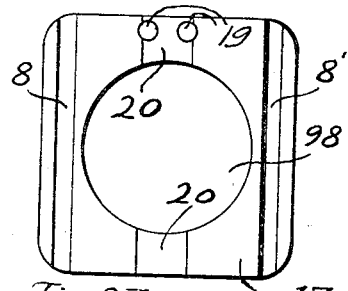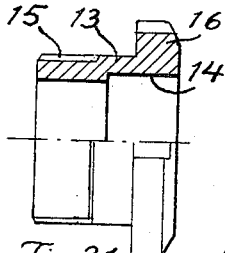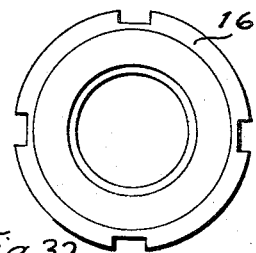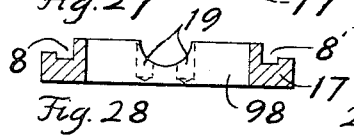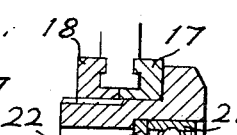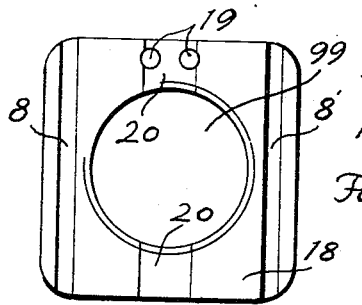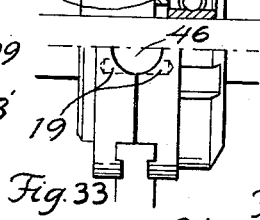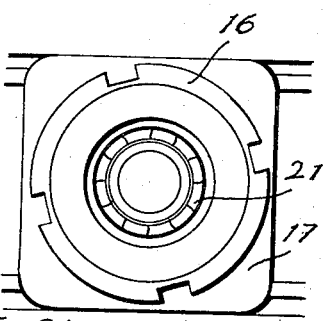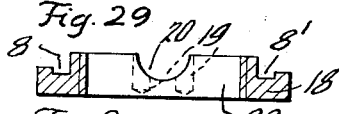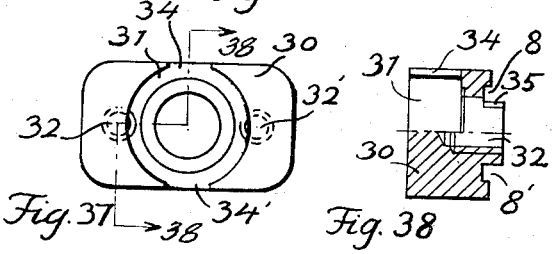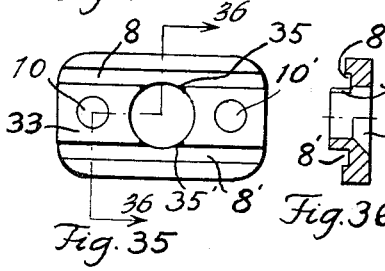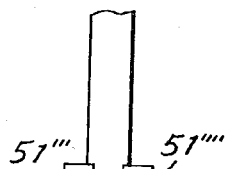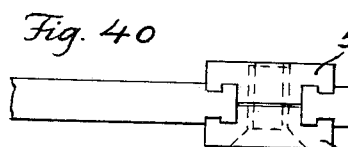

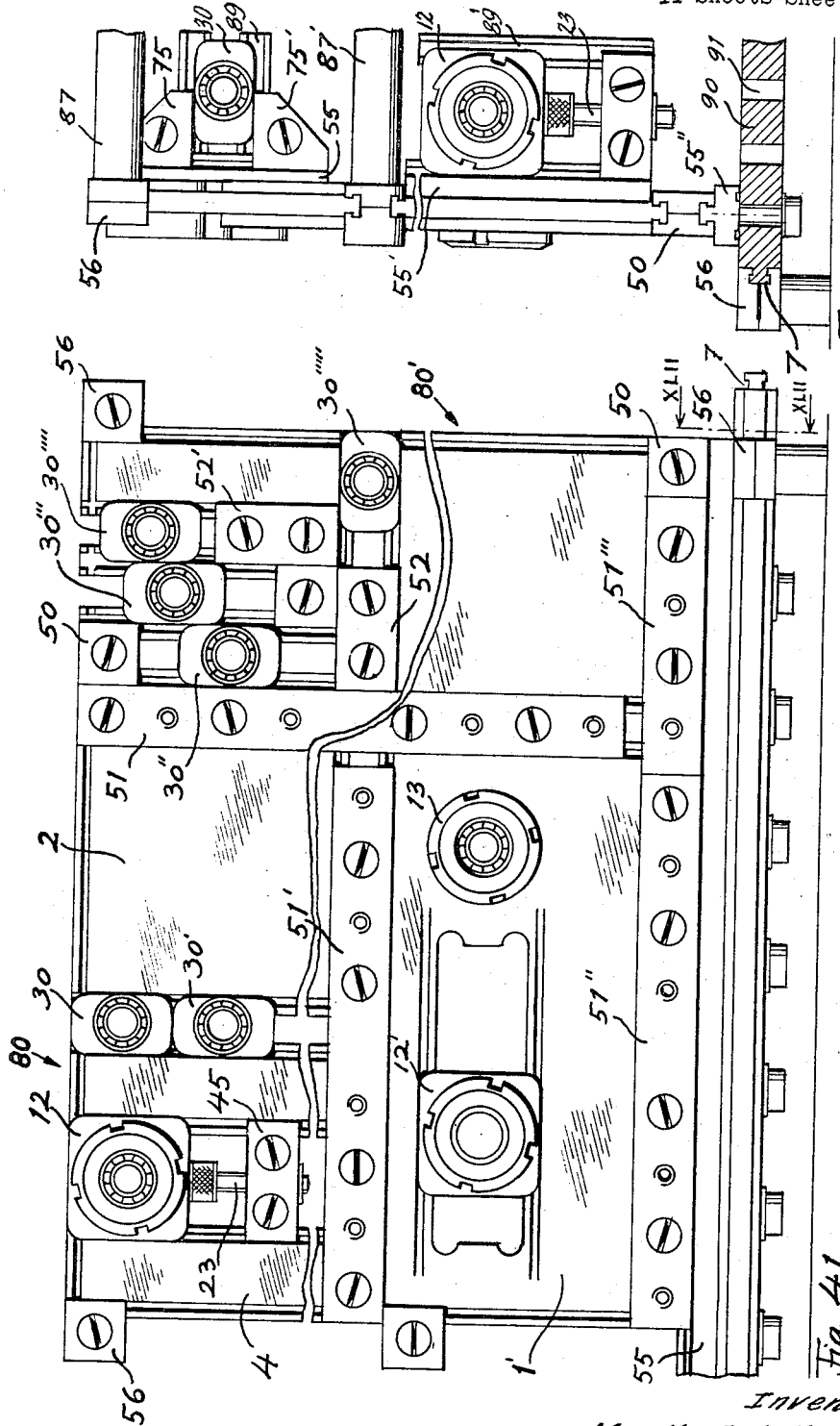

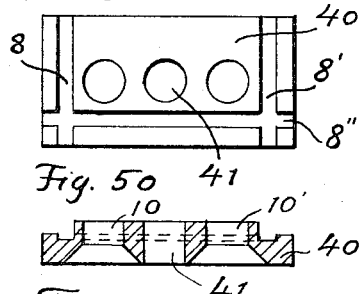
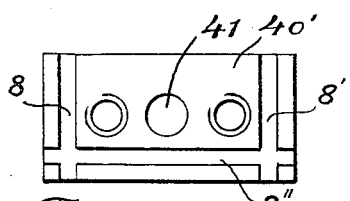
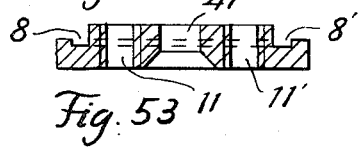
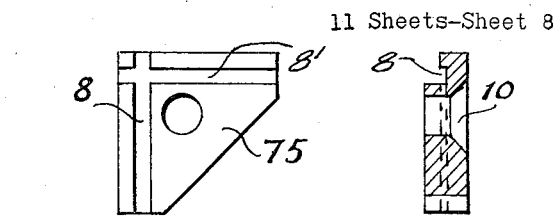
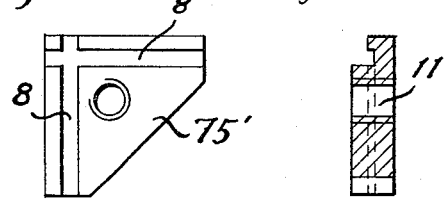
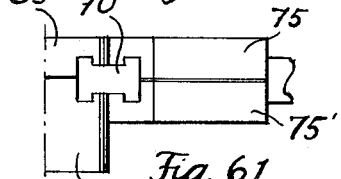
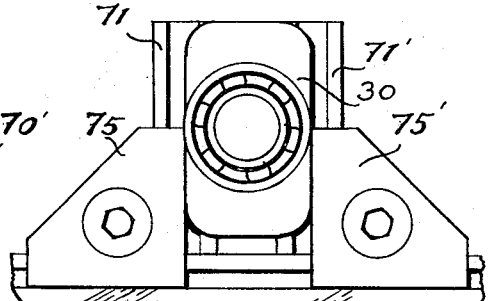
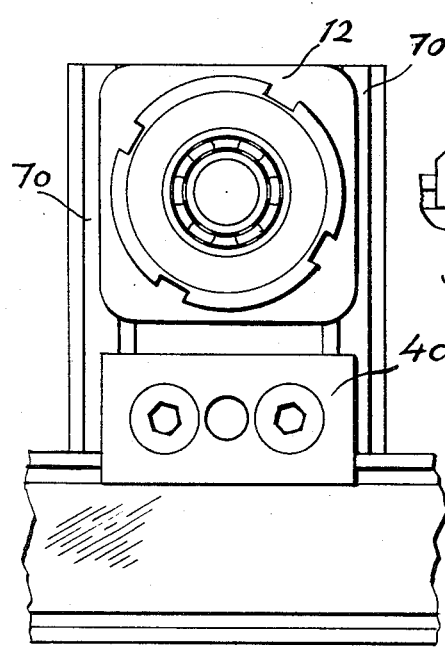
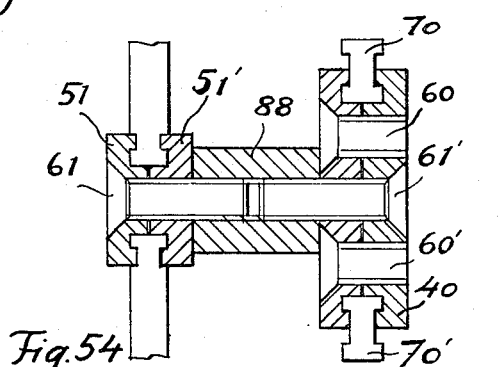

Oct. 15, 1968 M. C. SYLWAN 3,405,458
BUILDING SETS

Filed Aug. 24, 1965 11 Sheets-Sheet 9

Inventor
Mark C. Sylwan,
By Sommers & Young
Attorneys

Oct. 15, 1968   M. C. SYLWAN   3,405,458
BUILDING SETS
Filed Aug. 24, 1965   11 Sheets-Sheet 10
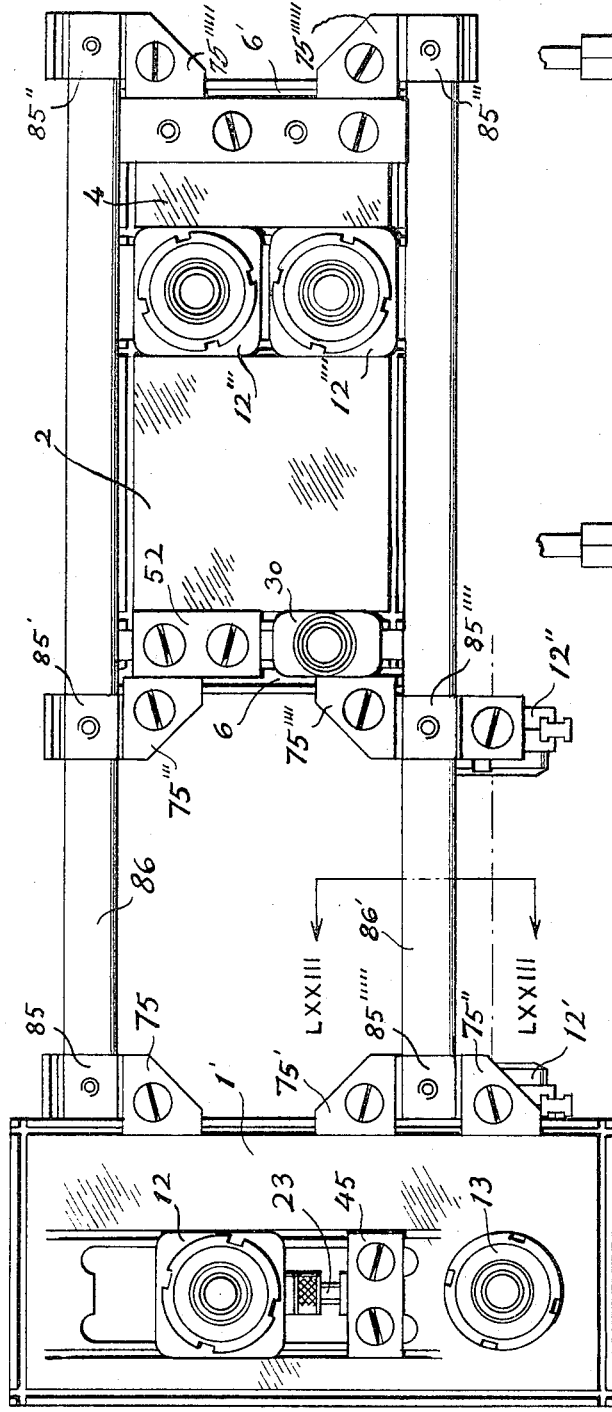
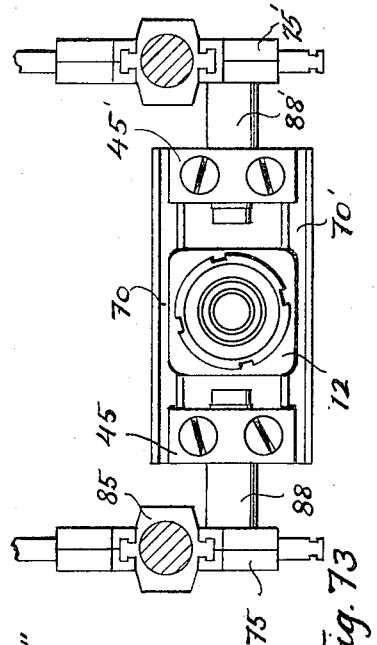
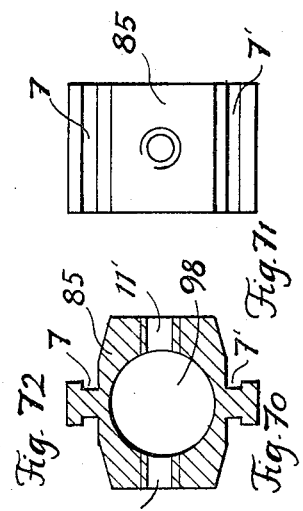
Inventor
Mark C. Sylwan,
By Sommers & Young
Attorneys

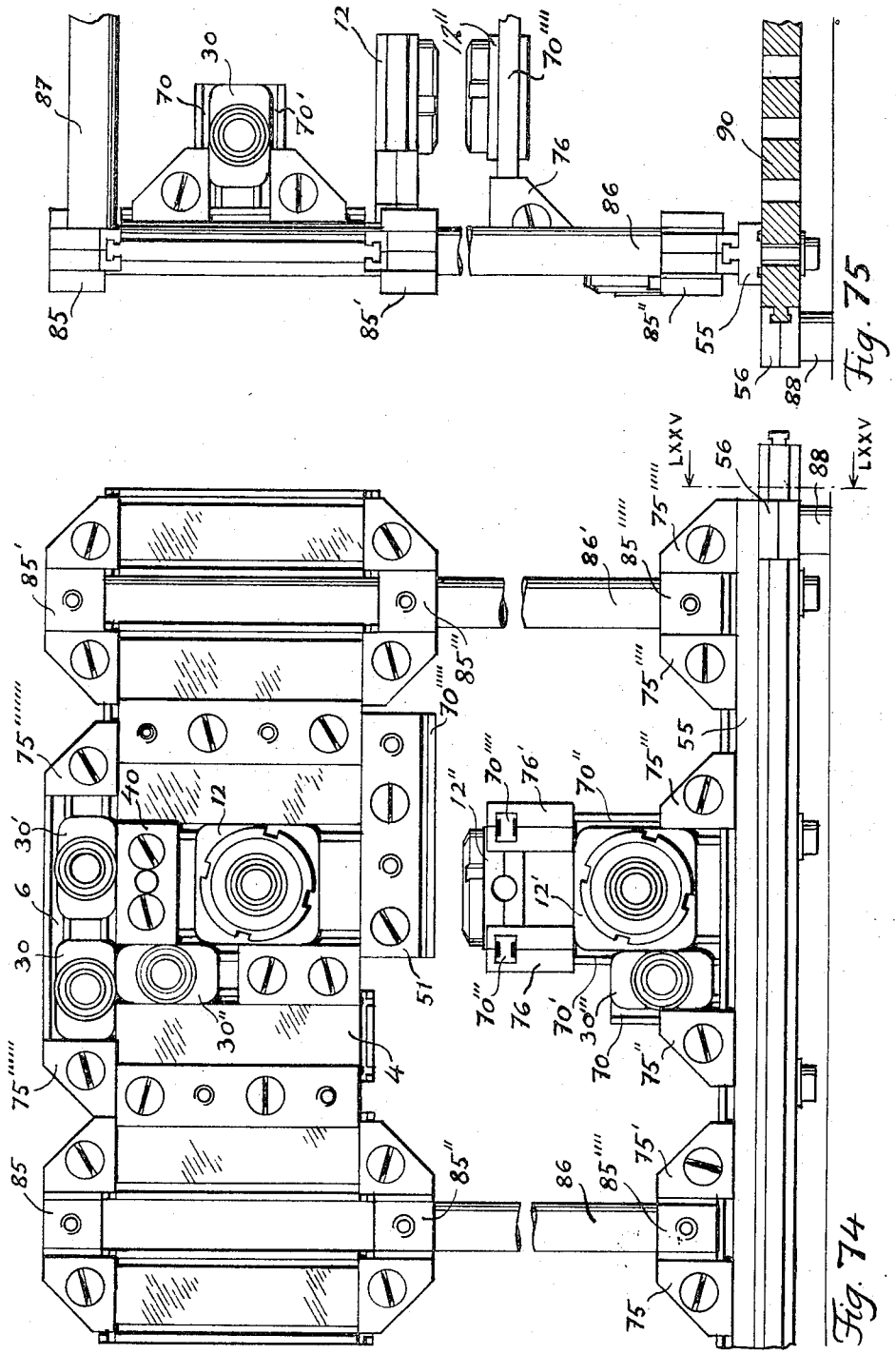

United States Patent Office 3,405,458
Patented Oct. 15, 1968

3,405,458
BUILDING SETS
Mark Christopher Sylwan, 7 Domargrand,
Hagersten, Sweden
Filed Aug. 24, 1965, Ser. No. 482,191
Claims priority, application Sweden, Aug. 31, 1964,
10,442/64; June 11, 1965, 7,680/65
10 Claims. (Cl. 35—16)

ABSTRACT OF THE DISCLOSURE

This invention relates to a mechanical component system for building structures mainly for performing mechanical processes, even if structures as afforded by the invention may also be employed for arranging stationary parts of different kinds.

---

The structures provided by the invention comprise plates or beams of metal or other equivalent material which are joined by means of corresponding male and female profile members, the male profile members of the said plates and bars being formed of grooves running along the edges at both sides and coupling means comprising divided female profiles in the shape of either smaller couplings, or coupling bars of varying length, such as guide bars for sliding bodies that are clamped about the male profiles by screw means.

These structures afford a continuous adjustment of plates and bars and of couplings clamped therebetween which may in certain cases comprise bearing units for shaft or bracket members for different components, such as guide bars for sliding bodies.

A further feature of the system is a substitution schedule founded on a modulus forming the base of the complete system and a pitch schedule which permits a whole plate or beam to be replaced by a mounting unit having the same exterior dimensions and assembled of one or more beams or narrower bars with interposed couplings or bearing units which by virtue of the continuous adjustability may be freely positioned within the space which has been taken up by the plate or beam. Through the said pitch schedule there are provided a plurality of unequally wide mounting spaces for female-profiled components.

The plates and beams have unbroken surfaces without screw mounting holes machined in advance therein, permitting any desired conditioning for special components.

The system also comprises a coupling bar of T-profile which corresponds to the mounting spaces between the plates and beams and does not have the step-shaped profile of other coupling bars, said profile having been replaced by a flat abutment surface with grooves therein for taking up the male profiles. This flat abutment permits the mounting of the bar against other bodies, such as sheet metal panels, or the like, to serve as base members for structures assembled of components in accordance with the invention.

More particularly the present invention relates to a building set or system for assembling mechanisms and machines of different kinds, preferably within the field of precision mechanics. This expression should, however, not be understood as imposing very strict limitations, as the design pattern according to the invention will permit the building of machine structures up to a limit above which the stresses acting upon the structures must be taken into account when designing and dimensioning the structural elements.

Building sets for mechanical structures have been known as toys since a very long time. Only in rather recent years have such sets begun to be used for professional work within the industry. Such professional systems are highly specialized, however, particularly when it comes to the frame members which are frequently provided for building structures of "Bread Board" type, and the systems used, as a rule, are subjected to rather small mechanical forces, such as are deemed sufficient for control purposes.

The use of prefabricated parts for mechanical structures that may be assembled without, or almost without, any machining or finishing work affords obviously great advantages, chiefly because the parts which are manufactured in great batches will become rather less costly than specially manufactured parts, and because they may readily be delivered from stock which will reduce delivery and waiting times to a minimum. Those advantages are, however, counteracted more or less by the fact that a building set always suffers from limitations compared with the freedom which ordinary workshop machining work will permit with respect to the shape and dimensioning of its products. Moreover, a formalized system of ready-made parts is generally tied up by constructional rules valid for the system, but not elsewhere, and sometimes differing greatly from common machining methods and conventional workshop practice. This fact may become frustrating, if a first model built with a building set shall be reproduced at a later stage by employment of ordinary workshop techniques and, thus, receive a design much differing from the prototype.

With the technical objects which form the basis of the building set according to the invention in view, I have listed some fundamental requirements which must be met by the system to make it fulfil its purpose. Those requirements are:

(1) The design pattern characteristic for the system shall correspond as closely as possible to conventional machine design.
(2) Within a given scale the system should be able to absorb relatively great mechanical forces.
(3) The basic equpiment of components of the system should be restricted to as small a number of rather simple components as possible.
(4) The structural components of the set must have such a stereometry as to permit an accuracy of such an order that the system may be used for instrumentations where the precision requirements are high.
(5) The design pattern of the supporting rigid structures should permit a maximum of variation of machinery design and of size.

Paradoxically enough, the inventive concept is to be found mainly in the requirement of Item 1 above. The reason therefor is to be found in Item 3. To copy mechanical design directly by means of a building set would require a practically unlimited number of components. A primary measure is to try to define and restrict the problem. For that purpose there is needed such a universal generalisation of the typical features of most mechanical structures as possible. I base such a generalisation upon the finding that most mechanical structures are mounted in a plate-like framework, with the plates either cast or cut out of sheet metal, that they are provided as walls of a closed housing or as opposite end walls connected by distance elements, and that bearings, brackets or apertures for movable components have been freely disposed there where deemed appropriate.

The problem of providing frame-work elements which may be joined together to form plate-like frame-works of varying size and shape, in which I may mount bearings for a great number of freely disposed shafts and also to find attaching points for bearing frames, brackets, etc. forming an angle with the frame plates is thought to be solved by the system according to the invention. In the annexed drawings I have endeavored to render as complete and convincing an illustration of my system as possible, although it could not be avoided that the drawings also comprise constructional details which form no part of this invention, but which assist in offering a picture of the system in its final constructional shape. It would also be a fault to omit completely these elements when describing the system, wherefore I will refer briefly to the design thereof.

In the annexed drawings elements and structures embodying the invention have been illustrated.

In the drawings:

FIG. 1 is a plan view of a rectangular-shaped structural plate.

FIG. 1a is a fragmentary cross sectional view along line Ia in FIG. 1, on an enlarged scale.

FIG. 1b is a side elevational view of the plate in FIG. 1, as well as of that in FIG. 2.

FIG. 2 is a plan view of another rectangular-shaped structural plate, having apertures formed therein.

FIG. 3 is a plan view of a square-shaped structural plate.

FIG. 4 is an end view of the plate illustrated in FIG. 1, being a side elevational view of the plate shown in FIG. 3, as well.

FIG. 5 is a cross sectional view along line V—V in FIG. 2.

FIG. 6 is a plan view of two narrow structural plates interspaced so as to correspond to the overall dimensions of the plate illlustrated in FIG. 3.

FIG. 6a is an end view of the interspaced plates in FIG. 6.

FIG. 7 is a plan view of two narrow plates or strips, combined so as to take up the same space as the plate in FIG. 1 or FIG. 2.

FIG. 7a is an end view of the plates in FIG. 7.

FIG. 8 is a plan view of a plurality of interspaced strips, combined to take up the same space as the plates illustrated in FIG. 3 or FIG. 6.

FIG. 8a is an end view on a larger scale of one of the strips in FIG. 8 or 9.

FIG. 8b is an end view of the combined structure in FIG. 8.

FIG. 9 is a plan view of two interspaced strips, combined to take up the same space as one of the plates or strips shown in FIG. 7.

FIGS. 10, 10a, and 10b illustrate an elongated clamp member in plan view, longitudinal sectional view and end view, respectively.

FIGS. 11 and 11a, 12 and 12a are a plan view and cross sectional view, respectively, of two mating square-shaped clamp members.

FIGS. 13, 13a and 13b illustrate another clamp member in plan view, side view and partly longitudinal section and cross sectional view, respectively.

Figure 14:
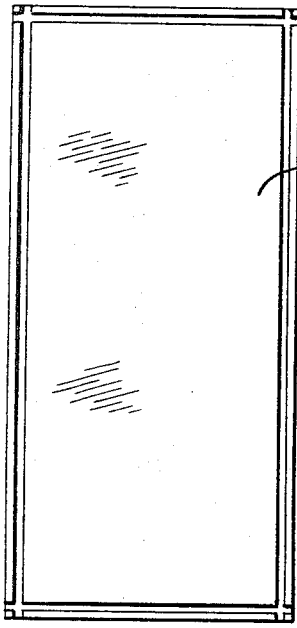
Figure 17:
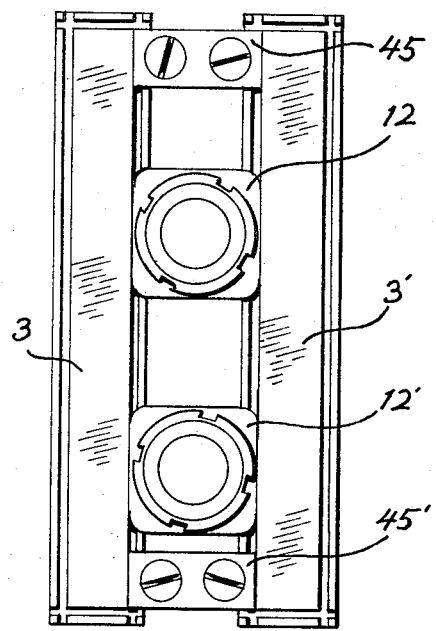
Figure 15:
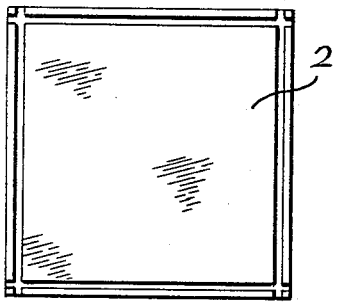
Figure 18:
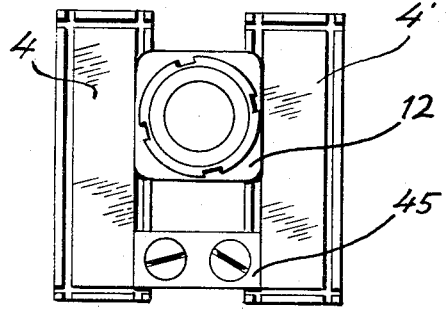
Figure 16:
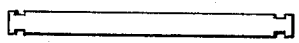
Figure 19:
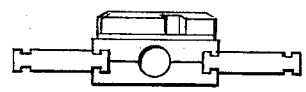

FIGS. 14, 15 and 16 are identical with FIGS. 1, 3 and 4, respectively and are provided for comparison with FIGS. 17, 18, and 19, respectively, which exemplify sub-assemblies that may be substituted for the plates illustrated in FIGS. 14 to 16.

FIGS. 20 and 21 are plan views of sub-assemblies which may take the place of the elements illustrated in FIGS. 6 and 7, respectively, and FIG. 22 is an end view thereof.

FIGS. 23, 24 and 26 are plan views of sub-assemblies which may replace the elements illustrated in FIGS. 1 and 3, respectively, and FIG. 25 is an end view of the sub-assembly illustrated in FIG. 24.

FIGS. 27 to 39 illustrate in different views various bearing units such as used with the sub-assemblies illustrated in FIGS. 17 to 26.

FIG. 40 is an end view of a more complex structure shown in plan view in FIG. 41. FIG. 42 is a side elevational view, partly in cross section along line XLII—XLII in FIG. 41.

Figure 43:
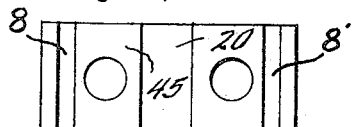
Figure 44:
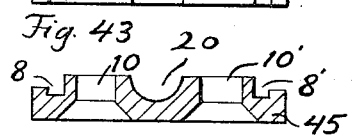
Figure 45:
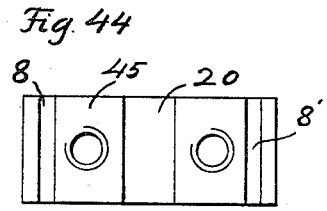
Figure 46:
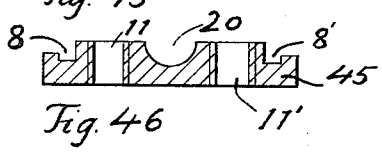

FIGS. 43 and 44 are a plan view and a longitudinal sectional view of a clamp element and FIGS. 45 and 46 corresponding views of a mating clamp element.

Figure 47:
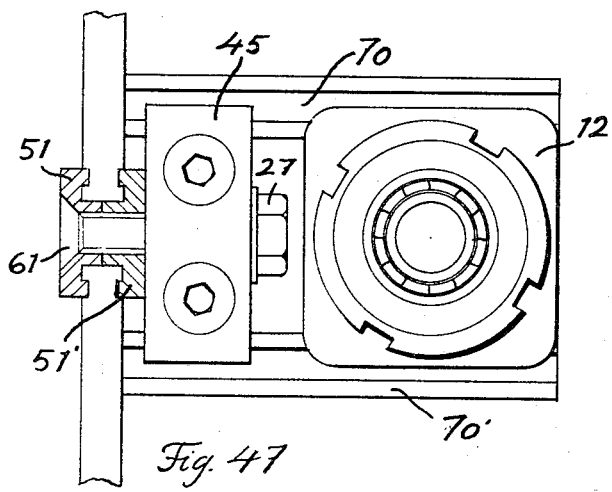
Figure 48:
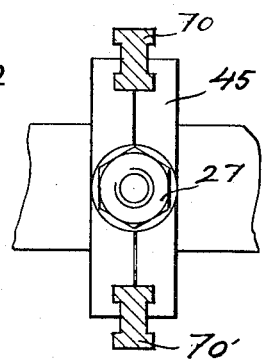

FIGS. 47 and 48 are a plan view and an end view, respectively, of a bearing mounting structure.

Figure 49:
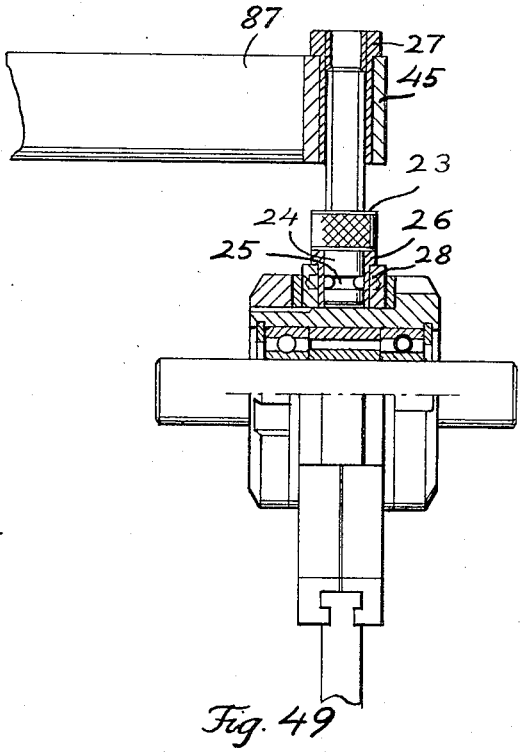

FIG. 49 is a side elevational view partly in cross section of another bearing mounting structure.

FIGS. 50 to 53 and 56 to 59 are different views of further structural parts.

FIG. 54 is a cross sectional view of a structure, whereof elements as illustrated in FIGS. 50 to 53 form part, and FIG. 55 is a plan view of another structure, partly assembled of elements as illustrated in FIGS. 50 to 53.

FIGS. 60 and 61 are elevational views of sub-assemblies employing among other parts those illustrated in FIGS. 56 to 59.

FIGS. 62 to 65 illustrate further clamp members and FIGS. 66 to 69 sub-assemblies employing such clamp members.

FIG. 70 is a cross sectional view and FIG. 71 a side elevational view of a pipe and rod coupling member.

FIG. 72 is a plan view of a frame-work structure employing, among other elements, the coupling member of FIGS. 70, 71, and FIG. 73 is a cross sectional view along line LXXIII—LXXIII in FIG. 72.

FIG. 74 is a side elevational view of a structure comprising various parts as illustrated in other figures, and FIG. 75 is an end view, partly in section along line LXXV—LXXV in FIG. 74.

FIGS. 1 to 13 illustrate the elements which form integral or composite plate structures. The elements shown in FIGS. 1 to 9 are shaped as plates or strips which all have a common feature in the shape of a circumferential T-profiled edge configuration 7 formed by a groove spaced from the edges and extending along the latter at both faces. The elements are made of metal or other, equivalent material and are relatively thick for making them suited to form frame-work structures having a sufficient strength to stand up to mechanical forces corresponding to the thickest shaft which may be journalled in said frame-work structures. FIGS. 1, 2, 4 and 5 illustrate the plates 1 and 1' differing in that plate 1' is formed with a slit 97 and a hole 96 for bearing units, whereas the plate 1 has an integral, unbroken face. Along the slit 97, FIGS. 2 and 5, a T-profile 7 is formed, similar to the one just described, formed by grooves extending along the edges. The plates 1 and 1', FIGS. 1, 2, 4 and 5, have such a rectangular shape as is formed when two square plates, 2, FIG. 3, are joined together by clamp members, FIGS. 10 to 13, mating with the T-profile. By such interconnection, a space D is formed between the plates such as illustrated in, FIG. 9. If the square plate 2, FIG. 3, has a side of the length B, that consequently means that the plates 1 and 1' or a composite plate assembled of two interconnected plates 2 have the measures A x B, wherein the measure A equals 2 x B+D.

Solely this modulus ratio which implies a tautology, is only one element—even if a basic one—for the inventive concept which is based in other respects on a purely structural description of the elements according to the invention.

In FIGS. 6, 6a 7 and 7a are showed groups formed by strips 4 and 3, said groups having the external measures B and A. The strips 3 and 4 have a width C which equals B/3, whereby the spacing between the strips will equal the width of the latter. This ratio is characteristic of the constructional design of the invention as illustrated in the drawings, but from the inventive point of view it is not in the first place the identity between the width of the strips and the spacing therebetween in such a group with the dimensions A x B that is essential:

This dimension ratio might be a different one without sacrificing the essentials of the invention.

FIGS. 8, 8a, 8b, 9 and 9a illustrate groups of strips 6 and 5, so arranged that five strips 6, FIG. 8, form a square with the side length B and a spacing of the strips equal to the width of the latter. It follows therefrom that groups of two equally long strips with a spacing equal to the strip width D form patterns with the same external dimensions as the strips 3 or 4, FIGS. 7 and 6, respectively, thus, with the width C. C therefore equals 3 x D. Also in this instance it is not essential from the inventive aspect that the spacing of the strips equals the strip width.

A pattern with the same external dimensions as any of strips 3 or 4 might have a different spacing of the strips 5 or 6 than one equal to the width of said strips.

This observation is an essential one, as the most important aspect of the invention is simply this, that plates such as shown in FIGS. 1 to 5 may be replaced by composite plates assembled of strips 3 or 4, and that the strips 3 and 4 may be replaced by composite strips assembled of the strips 5 or 6.

The clamp members shown in FIGS. 10 to 13 have a profile shape mating with the T-profile of the plates and strips, and a corresponding profile shape characterizes a whole group of elements according to the invention.

The clamp member in FIGS. 10, 10a, 10b is used for interconnecting plates and strips to patterns of desired shape and size, and in the interspaces between those T-profiled elements, thus assembled, also bearing units for shafts may be mounted, as well as clamps with the same width and profile shape. FIG. 10a shows that the clamp member is formed with screw holes 10, 10' and 11, 11', alternatingly smooth and threaded, to permit identical clamp members to be used at opposite sides of a connection, with clamping screws entered either from both sides, or only one. As the profile shape for interjoining the elements is based on the right angle, all forces in the plane of a composite plate are absorbed by the profiles, the screws being relieved so that they may be made with rather small diameters in relation to the acting forces.

The clamp in FIGS. 11, 11a, 12, 12a has the same profile shape as the clamp member in FIG. 10. It has a square shape and comprises two elements 57 and 58, one having a smooth bore 10 for passing a screw and the other having a threaded bore 11 and serving as a nut. This clamp is frequently employed in such joints between strips or plates from which distance rods connecting the frame-work plates extend, FIG. 42, only the element 57 being employed for a screw passing through the clamp and secured in a threaded blind bore in the extreme end of the distance rod. Such a clamp is also employed in other instances where a similar screw action is desired.

The stepped clamp member in FIGS. 13, 13a, 13b provided with a thicker clamp member as in FIG. 10 with a longitudinally extending T-profile 7 and with threaded blind bores 49 with the same spacing as the holes in the clamp member in FIG. 10. The inside face of the stepped clamp member is flat, but longitudinal grooves 8 form the complementary profile therein, and thus there is no projecting part which is important when the stepped clamp member shall be clamped to base plates, FIGS. 41 and 42, or against the walls of an apparatus casing wherein forms bracket means for structures according to the invention (not illustrated). For these uses the largest possible interengaging surfaces are needed, cf., FIG. 40 that illustrates the employment of the stepped clamp member of FIG. 13 combined with the clamp member of FIG. 10, when transverse structures are built to extend therefrom, either as angularly disposed bearing frames, FIG. 42, or for the forming of box-like structures.

In FIGS. 14 to 26 the T-profiled frame-work elements illustrated in preceding figures have been complemented with bearing units and clamp members which all are formed with a profile complementary to the T-profile and being of two different widths, corresponding to the spacings C and D of the T-profiled elements. The integral plates 1 and 2 in FIGS. 1, 3 and 4 (repeated in FIGS. 14–16) may be replaced by sub-assemblies or assembly units of increasing complication, but with the same external dimensions as the one-piece plates. Such structures and assembly units are illustrated in FIGS. 17–19 and 23, 24 and 26. These composite units may obviously be of other proportions than those illustrated, the square or rectangular shape having been chosen further to stress the basic importance of those shapes for the design and mutual correlation of the elements. In all instances the profiled edge at the circumference has been left unobstructed (save in FIGS. 24 and 25), and thus the character of the substructures as interchangeable assembly units has been emphasized. They consequently may be employed for mounting into larger frame-work structures. By the provision of the circumferential profiling characterizing all T-profiled elements belonging to the system described, thus, a square unit as in FIGS. 24, 25, or the upper part of the unit in FIG. 23 may change its position relative to the frame-work structure as a whole without modifying the fastenings or the space intended for receiving the unit.

Bearings which may be displaced horizontally in one position of the unit may, thus, readily be readjusted for vertical displacement, a movability to the left could be changed to one to the right, etc., without rebuilding the respective frame-work unit. This technical achievement forms the basis for the choice of the square as a fundamental shape.

FIGS. 17 to 19 illustrate frame-work units assembled of the strips 3 and 3', 4 and 4' and with bearing units 12 and 12' for shafts as well as clamps 45 and 45' for uniting the strips. The uniting elements (bearing units and clamps) that are employed here, will all require the same spacing C (FIG. 7a) of the strips, so that the structures formed will have the width B. They may consequently, when needed, replace for instance the plates 1 and 2 in a larger frame-work structure aggregate. FIGS. 20 to 22 illustrate composite strips assembled of the strips 5 and 5', 6 and 6', respectively, and having the width C. The connecting elements comprise the bearing units 30, 30' and 30" and the clamp 50, FIG. 20. These connecting elements determine the spacing D of the strips, and the composite strips (FIG. 9a) thus, formed, may replace the strips in the units illustrated in FIGS. 6 and 7 and will accommodate a substantially greater number of freely adjustable shafts with corresponding bearing units.

FIGS. 23 to 26 illustrate units of square (FIGS. 24 and 25) and rectangular (FIGS. 23 and 26) shape with a relatively great number of bearing units, disposed asymmetrically within the units. In the unit in FIG. 23 the bearing units 30, 30' and 30" have been disposed along an arc of a circle traced with its centre in the bearing 30'''. Such a unit may, as an example, be employed with a printing cylinder and inking rollers engaging therewith.

The square unit illustrated in FIGS. 24 and 25 comprises three asymmetrically disposed bearing units. The clamps 50' and 50" encroach upon the external profile, where the arrangement must be such that the obstructed edge faces outward and forms part of the circumference of a larger frame-work assembly, in which the said unit is secured by its three unobstructed profiled edges. The bearing 30 is mounted in the same space as is the larger bearing 12, and it is demonstrated how a bearing unit space with the width C will accommodate three parallel center lines for shafts. The short strip 70 forms the T-profiled connecting element for the bearing 30 and the clamp 50'. This strip 70 falls outside the pattern described, as its end portions lack profiling, but the system is presupposed to comprise elements having the profile of the strips, but other lengths than A and B and without end profiling. These elements fall within another group than the one described above, however.

In FIG. 26 a rectangular unit is formed, made up, in part, of a square assembly comprising strips 4, 6''' and 6'''', bearings 12 and 30, and a clamp 52'. By turning this unit through 90°, the bearings may have their direction of adjustment changed from vertical to horizontal, with the unit unaltered in other respects. The clamps 52 and 52' only have two screw holes each of the same kind; these clamps, thus, comprising like the clamps in FIGS. 11 and 12 two elements with clearance holes and threaded holes, respectively. The unit of FIG. 26 further comprises strips 4', 6, 6' and 6" and clamp members 51, 51' and 51".

By the description given above the most important features of that part of the invention, which implies to a more striking degree a particular building method characteristic of the system, have been disclosed. When frame-work assemblies according to the pattern described have received the desired shape and size, the designer has got the counterparts to the frame units of a plate-formed kind which he is accustomed to have fabricated by workshops according to his specifications. To subsequently assemble the plates to opposed frame portions between which the moving parts are disposed, by the help of distance elements of different kinds, such as rods, does not differ from the design methods he is accustomed to employ for ordinary machine design.

With this pattern the requirement of Item 1 above, thus, has been met as far as possible. The number of interacting elements which is included in the pattern is reduced to a minimum so that also the requirement in Item 3 has been met. The width of the bearing slots C permits the mounting of shafts which are rather heavy compared with the size of the frame structures, and if a suitable material is chosen for the frame-work structures with a strength proportional to the forces which may be absorbed by the thickest shafts, this means that the system may absorb great mechanical forces in proportion to its scale, and, thus, the requirement in Item 2 has been met. The design of the elements and the building method further permit an execution with a great accuracy, so that also the requirement in Item 4 has been fulfilled. With regard to the last requirement (Item 5) the following description will answer the question whether the system allows of such a great variation in the choice of rigid structures, that it may compete successfully with machinery specially made to specification. Merely the freedom in arranging the bearing units in frame-work plates, and the faculty of great concentration of a plurality of bearings with small center distances will meet to a great extent advanced requirements in this respect.

The bearing units for shafts have already been mentioned. The bearing units are primarily based on complementary-profiled, pair-wise engageable bearing housing halves which are clamped onto T-profiles, either with ordinary screws or with a threaded sleeve which permits the passage of shafts and serves as a housing for ball bearings or plain bearings.

FIGS. 27 to 30 illustrate two bearing-housing halves 17, 18 for bearing unit spaces with the width C, the profile 8, 8' mating with the T-profile of plates and strips, the halves having large holes 98 and 99 for a mounting sleeve 13, FIG. 31. The hole 98 in member 17 is smooth, whereas the hole 99 in member 18 is threaded, and the latter part, thus, serves as a nut for the sleeve 13, FIG. 31, the threaded portion 15 of which only takes up as much space as is needed for the bearing-housing member 18, FIGS. 29 and 30. The remaining portion of the neck of the sleeve is a snug fit in the hole 99 in the bearing-housing member 18, FIGS. 27 and 28. See further FIG. 33 which shows a mounted bearing unit with a built-in ball-bearing 21 and an ejector ring 22. A similar mounting may be used for a plain bearing bush (not illustrated) which requires less space, and consequently permits the employment of this structure for heavier shafts. The bearing-housing halves 17 and 18 are formed with a semi-circular groove 20 extending across the holes 98, 99 in the center line thereof and parallel to the profiles 8, 8', said grooves forming in an assembled bearing unit a cylindrical hole 46, FIG. 33. The housing members also have blind holes 19 drilled within that groove, FIGS. 27 to 30, which serve to receive pins that retain a setting screw 23, FIG. 49, destined for accurate adjustment of the bearings in the longitudinal direction of the elongated spaces accommodating the bearing units.

A bearing housing for mounting in frame-work spacings of the width D is illustrated in FIGS. 35 to 39. This bearing those denoted 30–30''' in FIGS. 23 to 26. FIGS. 37 and 38 illustrate the bearing housing proper which comprises a profiled member 30 with a countersunk socket 31 for a ball bearing, said socket, owing to the small width merging with lateral apertures 34 and 34'. The ball bearing consequently lies open in those directions. The same applies for the through-going bore for the shaft which has similar apertures 35. The screws securing the bearing are screwed into threaded blind holes 32 and 32'. The mating member 33, FIGS. 35 and 36, corresponds to the profiled member of the bearing housing, but has through holes 10 and 10' for screws.

The structure illustrated in FIGS. 40 to 42 is an application of the same pattern shown in FIGS. 1 to 26 employed for a frame-work structure of a larger size. The frame-work structure is built upon a flat-ground base plate 90 formed with screw slits 91. Connecting elements between the base plate and the frame-work structure proper are in this case the stepped clamp members 55 and 55''. The same member is employed also for the building of bearing frame-works 89 and 89' forming right angles with the frame-work structure face, FIG. 42.

The base plate 90 has a circumferential T-profile 7 of the same shape and dimensions as other T-profiled elements. By the relative height of the plate it is attained that the clamp members uniting several plates will become sunk below the face of the plate which is advantageous when one will freely choose at such composite "tables" the disposition of different function units right opposite the joints. The base plate is spaced from the supporting surface by short sleeves screwed to profile clamps 56. These elements have a profile for locking engagement only along one edge, whereas the opposite edge has an abutment portion formed by inclining the inner faces of the clamp elements from this abutment towards the profile. In other respects this clamp has the same dimensions as the clamp in FIGS. 11 and 12.

In the frame-work structure a plate 1' is mounted and supports two bearing units 12' and 13. This plate is intended for employment with mating shafts subjected to an extremely heavy load, as the profiles might become over-stressed and might give way after prolonged use. Even if the bearing units should sustain great forces without beginning to creep after clamping to the T-profiles, as a safety device a distance element may be interposed between the bearing housing and the end portion of the mounting space, such as a rod secured in the hole 46, FIG. 33. All frame-work units are joined together by the clamp members 51, 51', 51", 51''' and 51''''. The space between the upper plate 2 and the unit 80 is filled up by the bearing housings 30 and 30' mounted therein. In the unit 80 there is provided the bearing housing 12, adjustable with the setting screw 23. This setting screw engages a nut incorporated in the clamp 45. In the same unit one side is taken up by the strip 4.

The unit 80' corresponds generally to that illustrated in FIG. 23.

In FIG. 42 the distance rods 87 and 87' and the bearing frame-works 89 and 89' mounted on the stepped members 55 and 55' are illustrated, the frame-work 89' being provided with the setting screw 23.

FIGS. 43 to 46 and FIGS. 50 to 53 illustrate a couple of substantially parallepipedic clamp structures. These structures are made up with the same profile as the bearing halves in FIGS. 27 to 30 with the sole difference that the clamp structure in FIGS. 50 to 53 lacks the semi-circular groove 20 characteristic for that profile. FIGS. 43 and 44 illustrate a clamp member which differs from the corresponding one in FIGS. 45 and 46 by the screw holes 10, 10′ in the former being smooth whereas the corresponding holes 11, 11′ are threaded in the latter. Both parts are formed with the semicircular groove 20 which extends in the same sense as the profiles 8 and 8′.

FIGS. 47 and 48 illustrate a bearing frame-work formed of the stirps 70 and 70′ and secured to the clamp members 51 and 51′ by a screw 61 engaging a nut 27 incorporated in the clamp structure.

FIG. 49 is a side elevation view, partly in section, of a bearing frame-work with a setting screw 23. The clamp member 45 has an incorporated nut 27 extended by a neck portion clamped in the clamp structure. The extended portion 24 of the setting screw journalled in the bearing housing is formed with an annular groove 25 which is engaged through recesses in the sleeve member 26 by pin members 28 provided in the bearing housing (see FIGS. 27 to 30). By the pins the screw extension is secured axially, while the threaded portion of the setting screw engages the nut 27.

The clamp structure in FIGS. 50 to 53 has an interlocking type profile along three edges. It is employed for bearing frame-works such as are illustrated in FIG. 55, as a support for guide means or bearing frame-works as in FIG. 54, etc. FIGS. 50 to 53 illustrate both of the members of the clamp structure, of which the member 40, FIGS. 50 and 51, and 40′, FIGS. 52 and 53, only differ by the screw holes, the member 40 having smooth holes 10 and 10′ while member 40′ has threaded holes 11 and 11′. Both members have a smooth hole 41 between the holes 10 and 10′ or 11 and 11′, respectively, and said hole 41 may be countersunk in the member in FIGS. 52 and 53 for the screw head which is conical in the illustrated embodiment.

FIG. 54 is a section view showing the position of the screws. This figure shows a structure in which a framework or a couple of guide members 70 and 70′ are provided spaced from frame-work plates, with a sleeve 88 as a distance element. The sleeve is secured by a screw 61 to the clamp members 51 and 51′. The frame-work or the guide members should be assembled in the first place by tightening the screws 60 and 60′, and is clamped subsequently to the sleeve 88 with the screw 61′.

In FIGS. 56 to 69 there are illustrated two components for uniting T-profiled elements at right angles. One component, FIGS. 56 to 59, is a clamp structure formed as a right-angled triangle with engagement profiles 8 and 8′ along the two smaller sides. As with the clamp structures already described, this structure has a smooth-bored member and a threaded-hole member 75 and 75′, respectively. A line drawn through the centers of holes 10 and 11 at an angle of 45° to the profiles of the smaller sides shall intersect the latter substantially at the middle, or as close as possible to the middle, the pressure, thus, being uniformly distributed along the profiles upon tightening the members against each other. FIGS. 60 and 61 illustrate the employment of clamp structures as described for a bearing frame-work, further formed of the strips 70 and 70′ and the bearing housing 30.

Figure 62:
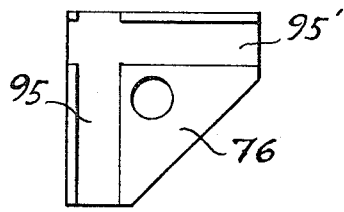
Figure 63:
Figure 64:
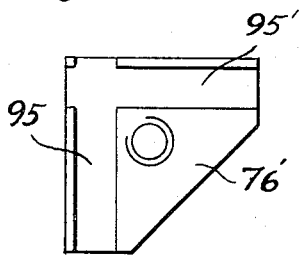
Figure 65:
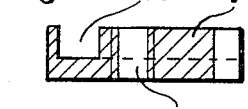
Figure 66:
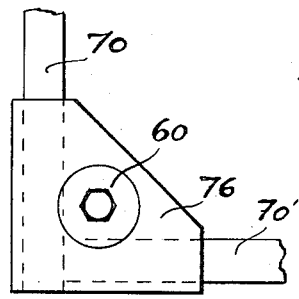
Figure 67:
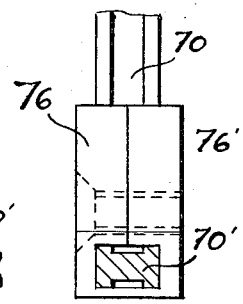

FIGS. 62 and 63 illustrate a similar clamp structure which engages the edges of the strips at right angles to their planes for angular connections according to FIGS. 66 to 69. That which distinguishes this clamp structure from the one just described is the profiling of the edges corresponding to the strips and being formed as a rectangular groove 95 and 95′, FIGS. 62 to 65. As a consequence of the nature of that profile shape, this clamp structure is somewhat larger than the clamp structure described above, but comprises, like that one, a member with a clearance hole and one with a threaded hole, the same rule for the disposition of the holes with regard to the angle formed by the profiles being valid. The employment of the clamp structure for uniting the narrow strips 70 and 70′ is illustrated in FIGS. 66 and 67. In such a structure the inside surfaces of the clamp members almost touch each other at the center lines of the strips. The screw 60 is formed, as in all preceding examples, with a conical head countersunk into the clamp structure.

Figure 68:
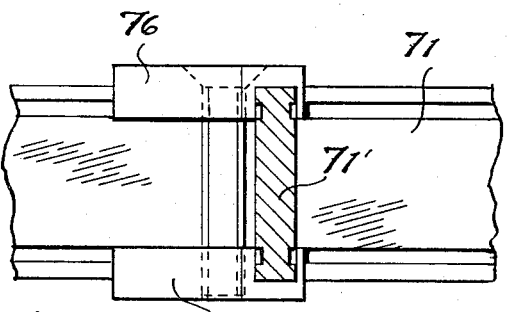
Figure 69:
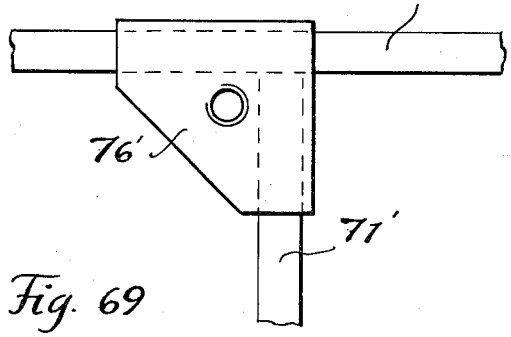

In FIGS. 68 and 69 there is illustrated a structure with the wider strips 71 and 71′, the clamp members 76 and 76′ being separated by a wide space which must be bridged by the screw. By reason of the pressure being distributed along the whole length of the profiles upon the tightening of the clamp structure, the distance between the clamp members may vary without affecting the strength of the assembly.

FIGS. 70 and 71 illustrate a coupling member for pipes or rods. A typical assembly executed with the use of said coupling member is illustrated in FIGS. 72 and 74, in which frame-work structures formed of T-profile elements belong to an assembly in which pipes or rods support or secure the frame-work plates in a certain relation to each other. Such assemblies are frequent where different operations are effected in functional units built of frame-work structures according to the invention, where these operations should be separated. To choose rods or pipes as connecting elements in such cases is appropriate by reason of the rigidity of such profiles in all directions and their commonness and low price. This design pattern is also usual in machine building and, thus, conforms to usual design practice. With the provision of the clamp structure in FIGS. 70, 71 the pattern according to the invention has consequently been substantially widened. With the building practice described earlier there are built principally frame-works and supporting structures, the most important characteristics of which is a concentration of the movable systems into delimited spaces formed by more or less open frame-work structures assembled of plates. With the now described clamp structure, and rods or pipes, the possibilities of scattering the different operation units of an assembly into all directions of space to the desired mutual distances are increased. Thereby the requirements as to concentration of the operation units on one side, and the possibility for the free disposition thereof within the space required by a certain process on the other side, are met.

The coupling member comprises a substantially parallelepipedic metal body 85. FIGS. 70, 71, with a through hole 98 for a rod or pipe and two opposite T-profile-shaped ribs 7 and 7′ parallel to the hole center line. The measure over the ribs is the same as for the wider strip, thus equal to C. This dimensioning enables the coupling member to be mounted in frame-work structures according to the invention, and beyond its most important function of forming support rods or pipes which support frame-work units, it will also afford mountings for pneumatic or hydraulic cylinders; such applications fall, however, outside the scope of the present disclosure. The width perpendicularly to a plane passing through the profile ribs is sufficiently great to accommodate threaded holes 11, 11′ of sufficient length for set screws to secure the rod or pipe rigidly. The coupling member may be formed of an extruded profile of metal or other, equivalent material or by sintered material. FIG. 72 illustrates a frame-work structure formed of the plate 1′ with bearing units 12 and 13 mounted therein, the bearing housing disposed in the slot being provided with an adjusting screw 23, and of a composite frame-work unit having the dimensions A x B, assembled of the plate 2, the strip 4, the narrow strips 6 and 6′ and the bearing units 12‴ and 12⁗. The frame-work units are interconnected at a certain distance by the pipes or rods 86 and 86′ and the clamp structures 75, 75′, 75″, 75‴, 75⁗, 75⁗′ and 75⁗″ which form connecting means between the T-profiles of the plates and the T-profile or T-profiles of the clamp structures 85, 85′, 85″, 85‴, 85⁗ and 85⁗′ which are secured to the pipes or rods with set screws.

To adjust, when needed, the spacing of the units obviously is a simple operation, since the unit mounted between the rods or pipes is displaceable along the latter, if the set screws are loosened.

The arrangement of the bearing units 12 and 12' corresponding to each other is illustrated in FIG. 73. This figure shows the bearing frame-work 12 as seen from the section line on rod 86' in FIG. 72. The frame-work is formed of the strips 70 and 70', the bearing unit 12 and the clamp structures 45 and 45' corresponding to the clamp structures in FIGS. 43 to 48. The clamp structures are screwed to the sleeves 88 and 88' which are in their turn fastened to the clamp structures 75 and 75'. Such a suspension of the frame-work permits, of course, the turning of the frame-work about the screws within the sleeves 88 and 88', whereby shafts may be disposed obliquely within the frame-work structure. As in all other examples shafts and wheels, or other movable parts have not been illustrated. The system according to the invention comprises only the frame-work building elements with bearing means, and to facilitate the understanding, no other bulky parts have been shown in the drawings.

FIGS. 74 and 75 illustrate a base plate 90 upon which is erected a frame-work comprising the rods or pipes 86 and 86' and supporting a composite plate frame-work structure rather high above the base plate. As the connecting element between the base plate and the rods or pipes serves the stepped member 55 as further do coupling members 85'''' and 85''''' and the clamp structures in FIGS. 56 to 59 which have been denoted 75, 75', 75'', 75'''' and 75'''''. Coupling members 85, 85', 85'', 85'''. 85'''' and 85''''' (FIG. 72) unite the rods with the elevated structure, as shown.

On the stepped member 55 further a composite bearing frame-work has been erected, formed of the strips 70, 70' and 70'' and the bearing units 30 and 12'. The connection with the stepped member 55 is effected with the clamp structures 75'' and 75'''. It is noted that the strip 70' is of such a width that it may be employed at the same time by two bearing units partly on the same level. The bearing unit 12'' is disposed on a horizontally extended frame-work formed by the strips 70''' and 70'''' which have been connected to strips 70' and 70'' by means of clamp structures 76 and 76', corresponding to the clamp structure in FIGS. 62 to 65. This bearing is assumed to journal a shaft, not indicated, which extends further through the bearing unit 12, FIG. 75. This bearing unit is mounted in a frame-work joined to the building unit with a clamp member (not shown) which has been united with the strip 51 to form an assembly which is further filled up by the strip 70'''''.

An upper bearing frame-work comprises the strip 6 and the bearing units 30' and 30'' and clamp structures 75''''''' and 75''''''''.

FIG. 75 illustrates the same structure as FIG. 74 in a slide elevation view. The screw slits in the base plate 90 are shown and its T-profile along the edge, supported by clamps 56. The stepped member 55 supports the rod 86 by means of the clamp structure 85''. Not shown on FIG. 74 is the distance rod 87 and the bearing frame-works 70 and 70' mounted on a stepped member. The clamp structure 76 is shown from the side supporting the horizontally extending bearing frame-work formed by strips 70''' and 70'''' and the bearing unit 12''.

The foregoing description has been made as complete as I have deemed necessary to afford a correct illustration of the system according to the invention grasped as a whole. I believe that the description will bear out that all parts belong as integral parts to a single inventive concept.

Many of the elements belonging to the invention, such as the interlocking T- and mating profiles may well be admitted to be known in themselves, but the novelty resides in their subordination under a main constructional concept which I deem to be novel.

I claim:

1. A building set for assembling mechanisms and machinery, comprising components of two types for building composite frame works, a first type comprising relatively wide strip members formed with a profile shape along their edges, shaft-bearing units having a profile shape complementary to the profile shape of the edges of said strip members, which units are rigidly clamped onto the profiles of said strip members and are, when still not tightened, freely adjustable longitudinally thereof, and provide a relatively wide space between said strip members, composite bearing frame works of this first type being formed as a quadrangle having a length which is a whole multiple of its width, the second type of component comprising relatively narrow strip members formed with a profile shape along their edges corresponding to that of said strip members of said first type and corresponding to a complementary profile shape on shaft bearing units adapted to be clamped to the profiles of said narrow strip members and freely adjustable longitudinally thereof when still not tightened, providing a relatively narrow space between said strip members, composite bearing frame works, of this second type being of the same dimensions as the strip members in the composite bearing frame works of said first type and capable of replacing the latter.

2. A building set as claimed in claim 1, characterized in that the components for building frame works also comprise integral plates having a profile shape along their edges similar to that of said strip members, said plates having such quadrangular shape that they are interchangeable, in assembled structures, with bearing frame works of the larger type.

3. A building set as claimed in claim 1, and in which there is provided clamp means having the same complementary profile as the bearing units, said clamp means being of two types, one fitting into the relatively wide space in composite bearing frame works of the first type and the other fitting into the relatively narrow bearing spaces in composite bearing frame works of the second type, said clamp means comprising two associated members adapted to be tightened with screws, the clamp means of said first type having two screws at either side of the center line of the bearing space and said second type having at least one disposed along the center line of the bearing space.

4. A building set as claimed in claim 3, and in which there is provided clamp means of the greater size having a center area serving as a bearing space, said clamp means having two screws at either side of the bearing space and semicircular groove formed in both associated members between the screws along the center of said bearing space, said grooves forming in the assembled clamp means a bore for a securing element with a circular cross section to be tightly engaged by said bore upon the tightening of said associated members.

5. A building set as claimed in claim 3, characterized by the provision of clamp means of the larger size with one transverse edge of both associated members being profile-shaped, in the same manner as the edges complementary to the profiles of said strip members, so that clamp means of this kind may unite two strip members with a third strip member or plate at right angles relative to the two former, a third hole being provided for a through screw between the two screws for tightening the clamp.

6. A building set as claimed in claim 1, and in which there is provided clamp means formed by two substantially similar members with substantially the shape of a right-angled triangle having its smaller sides formed with a profile shape complementary to that of said strip members to unite such strip members at right angles, said clamp means having holes for passage of clamping screw means, said holes being disposed in the angle subtended between the profiles so that a line extending through the center of said screw means at 45° to the profiles will lie so far inside the end points of the profiles that the pressure is distributed substantially uniformly along the length of said profiles.

7. A building set as claimed in claim 6, and in which said substantially right angular clamp means comprises two associated members having such a profile shape at the short sides of the triangle that it will engage over the edges of said strip members at right angles to the plane thereof, said strip members being rigidly united at right angles to their planes upon tightening said clamp means, a clamping screw disposed as far into the angle subtended between said profiled sides that a line extending through the center of the screw at 45° to the profiles will lie so far inside the end points of the profiles that the pressure exercised by said screw will be distributed substantially uniformly along the whole length of said profiled sides.

8. A building set as claimed in claim 1, and in which pipes or rods are provided, coupling means for said pipes or rods having a circular cross-section, and coupling means comprising a body having a hole therethrough for passage of said rod or pipe, and external integral, diametrically opposed profile ribs parallel to said hole and being of the same shape as the profiles of the strip members and with the greatest dimension over said ribs equal to the width of the widest strip member, the material in the portions of said body at right angles to a plane passing through said ribs being shaped with threads for screws for securing said pipe or rod.

9. A building set as claimed in claim 8, and in which there is provided base plate means having longitudinal screw slits and a shaped profile along the edges, said profile being so disposed, owing to the relative thickness of said plate means, said clamp means do not extend beyond the plane formed when at least two base plates are united to a larger plate structure.

10. A building set as claimed in claim 9, and in which there is provided a T-profile element in the shape of a clamp member having screw holes along its center and, along the outer face of said member, longitudinally extending rib means shaped with a profile similar to that provided on said strip members, frame work elements monuted upon said member forming right angles with frame work structures in which the T-profile element forms clamp means having a profile formation complementary to that of the plates and strip members.

References Cited

UNITED STATES PATENTS 1,974,838    9/1934    Schmid _____ 46—16

FOREIGN PATENTS 377,258    6/1964    Switzerland.

EUGENE R. CAPOZIO, *Primary Examiner.*

H. S. SKOGQUIST, *Assistant Examiner.*